United States Patent [19]
Cerminara, Jr.

[11] Patent Number: 5,511,369
[45] Date of Patent: Apr. 30, 1996

[54] CHUTE TO PREVENT CLUMPING OF GRASS EJECTED FROM A MOWER

[76] Inventor: Frank Cerminara, Jr., 3482 Limekiln Pk., Chalfont, Pa. 18914

[21] Appl. No.: 342,885

[22] Filed: Nov. 21, 1994

[51] Int. Cl.⁶ ..................................................... A01D 35/26
[52] U.S. Cl. ..................... 56/320.2; 56/DIG. 24
[58] Field of Search ............................. 56/320.2, 320.1, 56/202, DIG. 24, 17.4

[56] References Cited

U.S. PATENT DOCUMENTS

| | | | |
|---|---|---|---|
| 3,646,739 | 3/1972 | Dahl | 56/320.2 |
| 3,905,181 | 9/1975 | Messner | 56/320.2 |
| 3,971,198 | 7/1976 | Lane | 56/202 |
| 4,106,272 | 8/1978 | Peterson | 56/202 |
| 4,502,271 | 3/1985 | Hansen et al. | 56/320.1 |
| 4,631,909 | 12/1986 | McLane | 56/202 |
| 5,398,491 | 3/1995 | Hartley | 56/320.2 |

Primary Examiner—Henry E. Raduazo
Assistant Examiner—Heather Chun Shackleford
Attorney, Agent, or Firm—John Shaw Stevenson

[57] ABSTRACT

A unique chute construction for a grass cutting mower which directs cut grass being ejected by its rotating blades through an opening in a hood surrounding its blades out of the mower in an upward fan-shaped pattern away from the mower and thereby preventing undesired clumping of the ejected grass when it hits the ground. The top portion of the hood that is adjacent to and which form an outer edge of the opening in the hood is tapered in an upward direction to form an upper first portion of the chute. A second portion of the chute forms an inside portion that employs a plate that is positioned beneath and in spaced apart relationship with the first portion and has the same taper as the first portion of the chute. The addition of this chute eliminates the need for an operator of a mower to take a second, time-consuming cut of the same grass in order to eliminate the clumps of grass that are generated by conventional mowers that do not have such a chute.

10 Claims, 2 Drawing Sheets

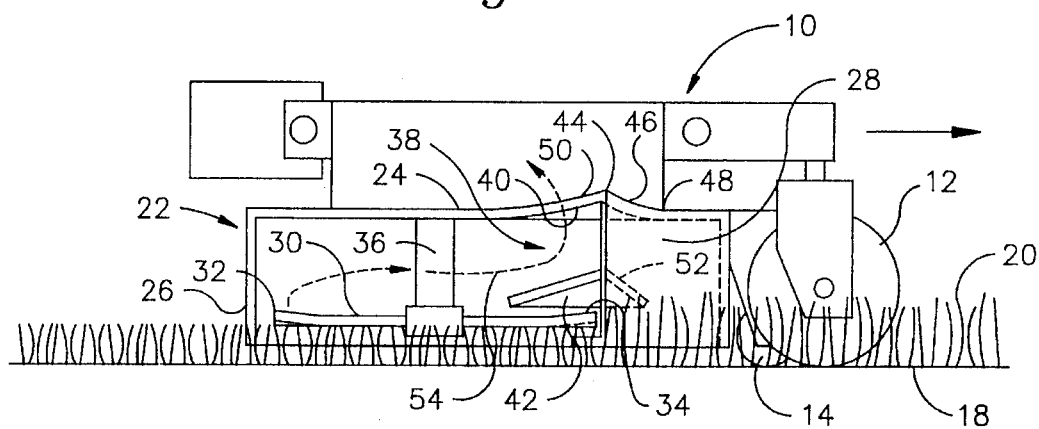
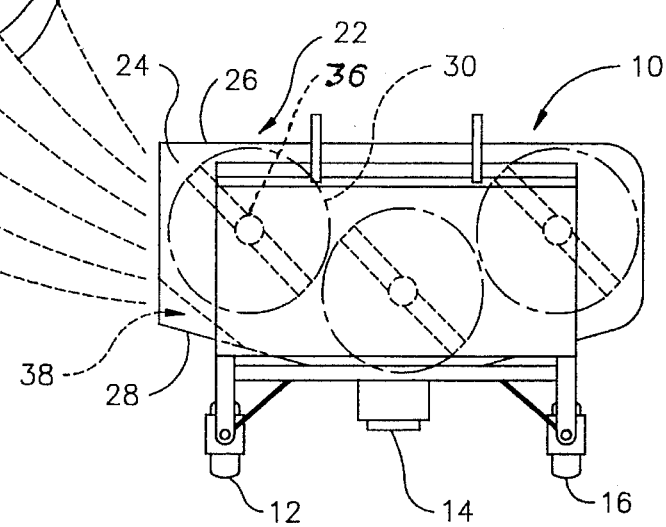
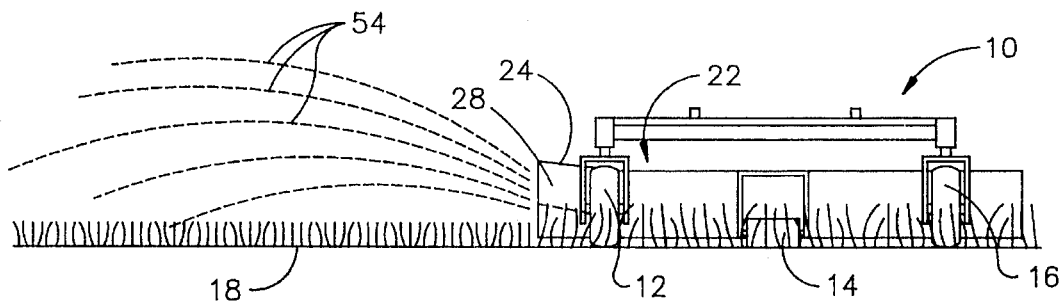

CHUTE TO PREVENT CLUMPING OF GRASS EJECTED FROM A MOWER

BACKGROUND OF THE INVENTION

1. Field of the Invention

The present invention generally relates to an improvement in grass mowers and, more particularly, to the addition of a chute that will direct cut grass being ejected from a mower in an upward fan-shaped pattern so it will be dispersed over wide areas of the ground rather than following its usual pattern of coming straight out of an opening in the side of a conventional mower and forming lines of clumped grass when it hits the ground.

2. Description of the Prior Art

Riding and walking, gas and electric, single and multi-blade grass mowers which generally travel and cut at high speeds are well known and widely used for cutting lawns of many sizes. These mowers employ a hood commonly referred to as a deck which covers and is spaced apart from the ends of the cutting and ejecting blade. This hood has an opening in its side through which the grass that is cut by the blade can be ejected away from the device to the area of the ground that is adjacent to this mower. Since this grass cutting blade generally turns at a very high RPM at any instant of time during a grass cutting operation, a large number of blades of grass will be ejected away from the hood in close proximity to one another. As these cut blades of grass fall on the ground in this state, they form undesirable clumps of grass that extend in long lines across the lawn. Furthermore, if these lines of clumped grass were allowed to remain on the ground, no grass could grow under these clumps and bare spots would appear in the lawn. Therefore, to eliminate these lines of clumped grass on a lawn, it is necessary for present-day operators of grass mowers to cut the same lawn a second time so these clumps of grass can be more evenly spread over the lawn. It can therefore be appreciated that the cost of cutting present-day lawns has had to be increased substantially because of the required time it takes to make this second cut.

SUMMARY OF THE INVENTION

One of the objects of the invention is to provide a chute on the open end of a grass cutting device that will receive the cut grass from the cutting blade and eject it out the open end of the hood in an upward, fan-shaped pattern so this cut grass will be dispersed over wide areas of the ground so no lines of clumped grass can be formed when this ejected grass hits the ground.

It is another object of the present invention to build into a conventional grass mower a unique chute to eliminate the expense of cutting the same lawn a second time because of the aforementioned lines of clumped grass.

Briefly, a preferred embodiment of this invention contemplates the provision of a hood that has an upwardly tapered end extending from an opening in the hood and inwardly therefrom to form the upper part of the chute. It also contemplates using a triangular plate that is spaced beneath the upwardly tapered end and which has the same taper as the upwardly tapered end and wherein the triangular plate is integral with and extends inwardly from the inside surface of the hood to form the lower part of the chute.

In another embodiment of the invention the inner part of the aforementioned lower part of the chute is pivoted to the wall of the hood so that the lower part can be moved about its pivot toward or away from the aforementioned upper part thereby providing for different heights of grass a means of enlarging or diminishing the angle between the upper and lower chute portions through which the blades of grass are ejected.

BRIEF DESCRIPTION OF THE DRAWINGS

The foregoing and other objects, aspects and advantages will be better understood from the following detailed description of a preferred embodiment of the invention with reference to the drawings in which:

FIG. 1 is a side view showing the chute formed in an upper and lower end portion of the hood and which forms an open end portion of the hood.

FIG. 2 is a top view of the grass mower performing a grass mowing operation showing how the chute causes the cut grass to be ejected from the mower in a fan-shaped pattern.

FIG. 3 is a front elevation view of the grass mower showing how the chute causes the cut grass to be ejected from the mower in an upward fan-shaped pattern.

DETAILED DESCRIPTION OF A PREFERRED EMBODIMENT OF THE INVENTION

Figure 4:
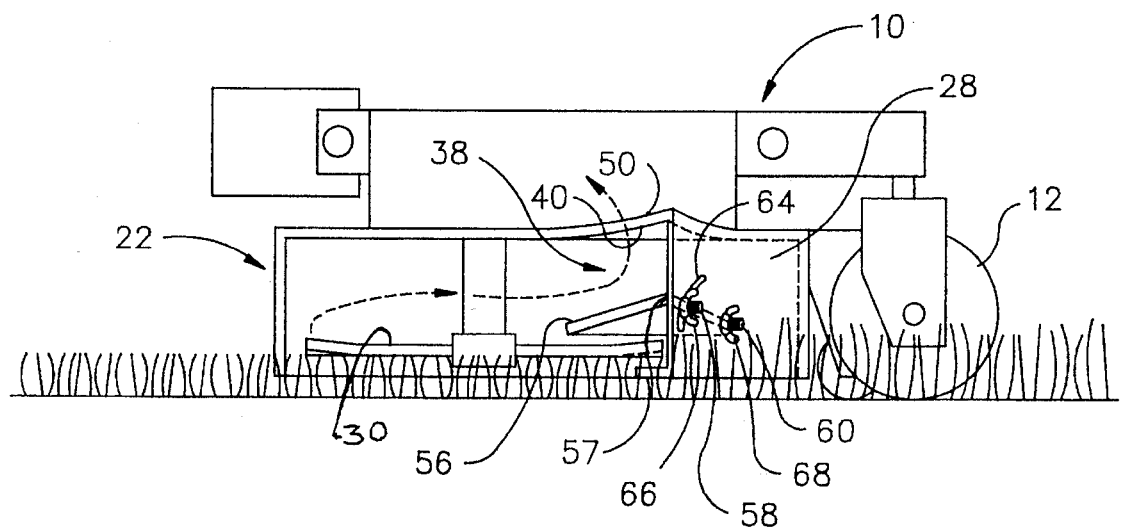
FIG. 4 is a view similar to FIG. 1 showing a modified form of the invention in which a mechanical device is employed to adjust the angle at which the lower portion of the chute is disposed with respect to its upper portion.

FIGS. 1, 2 and 3 show a grass mower 10 that has wheels 12, 14 and 16 that can be moved by a tractor, not shown, in the left to right direction from the position shown in FIG. 1 as indicated by the arrow over ground 18 containing tall grass 20 that is to be cut. The mower 10 is shown having a hood 22 that has a protective top wall portion 24 and protective side walls 26, 28 positioned about and in spaced apart relationship to the cutting unit shown as a blade 30. This blade 30 as is best shown in FIG. 1 has turned up end portions 32, 34. The blade 30 is generally driven at very high speeds by a motor driven spindle 36.

The chute 38, as is best shown in FIG. 1, has an upper portion 40 and lower portion 42 that are tapered preferably at a thirty degree angle. The lower portion 42 is preferably positioned immediately above the periphery of the cutting blade 30. The upper portion 40 is shown in FIG. 1 as having the upper outer end portion 44 of the protective side wall portion 28 extending above the flat top portion 24 of the hood 22. FIG. 1 further shows this outer end portion 44 of the wall 28 tapered downwardly at 46 like the hypotenuse of a right triangle to a point 48 where it is at the same level as the flat top portion 24 of the hood 22. The upper portion 40 of the chute 38 also shows that it provides the top wall portion 24 of the hood 22 that is adjacent to the tapered surface 46 of the side wall 28 with a tapered portion 50. The tapered portion 50 is shown in FIG. 1 extending from its flat surface 24 in an upward direction to the downwardly tapered surface 46 and between the upper outer end portion 44 of the side wall 28 and to the point 48 where it is at the same level as the flat top wall portion 24 of the hood 22.

As previously mentioned, the chute also is shown having a lower portion 42 in the form of a triangle as shown. One side of the triangular lower portion 42 is made integral with the inner surface of the side wall portion 28. The lower portion 42 is shown extending from the side wall portion 28 at the same tapered angle as upper tapered portion 50 of the upper chute portion 40. FIG. 1 shows that the portion of the wall 28 that extends between portions 40, 42 forms a side of the chute 38.

FIGS. 1, 2 and 3 thus illustrate how the rotation of the blade 30 pushes the cut grass 54 upwardly into the chute 38 and how the cut grass 54 received by the chute 38 ejects it in an upward fanned-shaped pattern, evenly distributed direction onto the ground 18 containing grass that has already been cut and without the occurrence of any lines of clumped grass.

Figure 5:
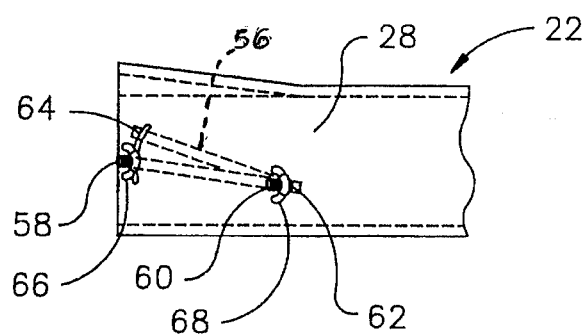
FIG. 5 shows an end view of the mechanical device shown in FIG. 4 showing how it can be used to adjust the angle of the lower portion of the chute with respect to its upper portion from an angle that is above or below that shown FIG. 4.

Referring now to the modified form of the invention as shown in FIGS. 4 and 5, it can be seen how the lower triangular-shaped portion 56 of the chute 38 that is integral with the protective side wall 28 as shown in FIG. 1 is now made of a separate triangular plate construction 56 which is the same size as the lower chute portion 42 as shown in FIG. 1. The edge 57 of the lower chute portion 56 that is positioned adjacent to the protective side wall 28 is shown having two spaced apart studs 58, 60 extending therefrom. The left threaded ends of each of these studs 58, 60 extend through and are threadly connected to the right end of the lower chute portion 56 that is shown in FIG. 4. The unthreaded central portion of one of these studs 60 is shown extending through a circular hole 62 in the side wall 28 of the hood 22 to allow the stud to form a pivot 60 for the lower chute 56 as is best shown in FIG. 5. The unthreaded central portion of the other stud 58 extends through a wall that forms an arc shaped cutout portion 64 in the side wall 28 of the hood 22. This construction allows the lower chute portion 56 to be moved about its pivot 60 with respect to the upper chute portion 40 by moving the right end of the stud 58 to a desired position in the arc 64 of the side plate 28.

FIGS. 4 and 5 also show a wing nut 66 on the right end of stud 58 and another wing nut 68 on the right end of stud 60 to retain the lower portion 56 of the chute 38 in any one of a number of different angular positions. The lower portion 56 of the chute 38 can thus be moved to different tapered Positions with respect to the tapered position 50 of the upper portion 40 of the chute 38.

From the aforementioned description of the grass mower 10 in FIGS. 1, 2 and 3 it can also be seen that a unique chute 38 can be incorporated into a conventional mower by converting it into a welded rather than a single casting as shown in FIGS. 1, 2 and 3. This can be done by separating the edge of the top flat right front portion of the conventional hood from the top of the front edge part of the side portion of the hood and then moving it away from this edge in an upward direction to a position that is similar to the cast position as shown in FIG. 1. A plate in the form of a right triangle can then be placed on the top of the front edge part of the side portion 28 that is adjacent the lifted top portion of the hood 22 and then welded at its bottom edge to the top flat edge of the side wall portion 28 from which the top portion has been removed. This triangular plate will be positioned so that it will taper in an upward direction toward the front open end of this side wall. The right edge of the raised top right portion of the hood is then welded to the top edge of the triangle that forms the upper end of the front portion of the side wall of the hood so that it will be the same shape as the unitary cast top wall portion and the upper right side portion of the side wall of the hood as shown in FIG.

1. A triangular plate, similar in size to the cast lower chute part 42, is then welded to the inside surface of the right side wall of the hood and extends inwardly at a position that is slightly above the periphery of the cutting blade 30 as shown in FIG. 1. The hood of a conventional grass mower spews cut grass out onto a cut grass lawn so that it forms lines of clumped grass. By this invention a conventional mower is for the first time converted into a mower 10 that will eliminate this undesired grass clumping. This has been accomplished by providing a chute 38 that will allow the cut grass from the mower to be ejected through this chute 38 in an upward fan-shaped pattern 54 and to be dispersed uniformly over wide areas of the ground 18. Because this chute disperses the ejected grass uniformly onto a lawn, there is no longer a need for the operator to cut the clumped grass a second time as is required with a conventional mower.

What I claim is:

1. A chute for a grass mower that employs a hood having a protective top and side wall that are spaced from the cutting blade of the mower and wherein the side wall has two spaced-apart edges extending downwardly from the top wall to form a cut out portion between said edges, said chute comprising the formation of a tapered portion in the top wall that extends in an upward direction from a point that is spaced inwardly along an upper edge of the side wall which is adjacent to a first one of said edges of said side wall toward a point that is above a top portion of the first one of said edges and wherein said tapered portion in the top wall forms an upper portion of the chute, the top of the side wall of the hood that is positioned below said tapered top wall being connected to the tapered top wall portion of the hood and having the same taper as the taper formed in the top wall said chute having a lower portion extending from the inner surface of said protective side wall and being spaced below and having the same taper as said taper formed in the top wall, said tapered upper and lower portions of said chute and the side wall extending between said upper and lower tapered portions providing a chute for receiving cut grass from the cutting blade and directing it through said cut out portion in an upward fan-shaped pattern away from said mower onto the ground without forming lines of clumped grass thereon.

2. The chute as specified in claim 1 wherein the lower portion of the chute is of a triangular-shaped configuration and tapered in an upward direction to said first one of said edges of the side wall.

3. The chute as specified in claim 1 wherein one end of said lower portion of said chute has a first end portion thereof pivotally connected to a side of said hood for pivotal movement of said lower portion along an inner side wall surface of the hood and a connecting means extending between a portion of said side wall surface of the hood and the other opposite second end portion of said lower portion of said chute for moving the lower portion of the chute about its pivotal connection along the side of the hood to adjust the angle of taper of said lower portion of the chute with respect to the angle at which the upper portion of said chute is tapered.

4. The chute as specified in claim 1 wherein the upper and lower portions of said chute are tapered at a thirty degree angle.

5. The chute as specified in claim 1 wherein the lower portion of the chute is pivotally connected at one of its ends to said protective side wall of said hood and wherein the other opposite end of the lower portion of the chute is adjustably mounted for moving said lower portion along said protective side wall of the hood to different angular positions with respect to the tapered top wall portion of the chute and a clamping mechanism is positioned between said lower portion of the chute and the protective side wall of the hood to retain the lower portion of the chute in any one of said angular positions.

6. The chute as specified in claim 1 wherein the lower portion of the chute is positioned immediately above said cutting blade.

7. The chute as specified in claim 1 wherein the tapered top portion of said side wall is a separate part that is connected to the top flat side wall of a conventional mower and said lower portion of said chute which is connected to said inner wall surface of said side wall is a separate part that is of a right triangular construction.

8. The chute as specified in claim 1 wherein said lower chute portion has a first stud connected thereto that extends from an outer end that is adjacent said first cut out edge portion of said side wall, a second stud connected to the lower chute portion and extending from its opposite end, an arc-shaped slot in said side wall for accommodating the passage of said first stud therethrough, a passageway through said side wall to accommodate the passage of the second stud therethrough and to thereby provide a pivotal connection between said lower chute portion and said side wall, a first connecting means to retain the second stud in a pivotal position in said side wall, said first stud and said arc-shaped slot in said side wall providing a means of adjusting the taper of the lower chute portion to different angular positions with respect to the taper of said upper chute portion and a second connecting means to retain the first stud and the lower chute portion in any one of said different angular positions.

9. A chute for a grass mower which employs a hood having a protective top wall which is in spaced relationship and above a cutting unit of the mower and a protective side wall positioned about and in spaced relationship with said cutting unit, said side wall having two spaced apart edges extending upwardly and into contact with said top wall to form a rectangular opening in said side wall, said chute comprising an upper and lower portion, a portion of said top wall adjacent one of said edges forming said upper portion of said chute, said upper portion of the chute having a tapered corner portion that extends in an upward direction to one of said edges that forms a wall of said opening in said side wall, the upper edge of said side wall below said tapered portion of said upper top wall portion of the chute being in contact with said top wall and having the same upwardly extending taper as said top wall, said lower portion of said chute being attached to an inner surface of said side wall and tapered in the same upward direction as said tapered upper portion of the chute and being positioned below and in spaced apart relationship with the tapered upper portion of the chute and immediately above the cutting unit and said tapered upper and lower chute portions and said side wall extending between said upper and lower chute portions providing a passageway through which the grass being ejected by said cutting unit will be directed through said rectangular side wall opening in an upward fan-shaped pattern and without clumping.

10. A chute for a grass mower which employs a rectangular-shaped hood having a protective top wall and two side walls which are in spaced apart relationship with a cutting unit of the mower and wherein one end of each of said side walls and an end of said top wall extending between said ends of said side walls form an opening in one end of said rectangular-shaped hood, said chute comprising a triangular-shaped portion forming a top end portion of a first one of said side walls at a position that is adjacent its open end, said top end portion of said side wall being tapered in an upward direction so that it extends to the open end of the first one of said side walls, a top wall chute portion of the hood being connected to the top of said triangular-shaped side wall and having the same upward taper as said triangular-shaped portion of the side wall, a lower portion of the chute being the same size as said top wall chute portion and being spaced below and tapered in the same upward direction as said top wall portion of said chute, said top and lower wall portions of the chute and said side wall providing a chute through which grass can be ejected through said rectangular opening in an upward fan-shaped pattern and thereby eliminate clumping.

\* \* \* \* \*